United States Patent Office 2,915,512
Patented Dec. 1, 1959

2,915,512

AMINATED POLYSTYRENES

Joseph A. Blanchette, East Longmeadow, Mass., assignor to Monsanto Chemical Company, St. Louis, Mo., a corporation of Delaware No Drawing. Application November 27, 1956
Serial No. 624,500

5 Claims. (Cl. 260—93.5)

This invention relates to new polystyrene derivatives containing reactive groups. More particularly, the invention relates to aminated polystyrenes.

Polystyrenes have found wide application in the plastics industry. However, for many applications it is necessary or desirable that a polymer contain reactive groups. It has now been found that certain polystyrenes may be modified to form reactive group-containing polymers having a variety of uses, particularly as ion exchange resins and as chemical intermediates.

One object of this invention is to provide new polystyrene derivatives containing reactive groups.

Another object is to provide aminated polystyrenes.

A further object is to provide processes for preparing the aminated polystyrenes.

These and other objects are attained by reacting hydroxylamine hydrochloride with a p-acylated homopolymer of a styrene compound and reducing the resultant oxime polymer.

The following examples are given to illustrate the invention. Parts mentioned are parts by weight.

Example I

A styrene homopolymer having a molecular weight of about 30,000 is acetylated by a Friedel-Crafts reaction to form a polymer containing one acetyl group per aromatic ring. Eight parts of the acetylated polystyrene and 6 parts of hydroxylamine hydrochloride are dissolved in a mixture of 24 parts of absolute ethanol and 45 parts of dry pyridine. The mixture is refluxed for 48 hours and then poured into cold water. Infra-red analysis of the product shows that substantially all of the carbonyl groups of the acetylated polystyrene have been converted to oxime groups.

Example II

A reaction vessel is charged with a suspension of 5 parts of lithium aluminum hydride in 44 parts of tetrahydrofuran. A solution of 5 parts of the oxime polymer of Example I in 44 parts of tetrahydrofuran is added with agitation to the suspension of lithium aluminum hydride under such conditions that the reaction mixture begins to reflux gently. When all of the polymer solution has been added, the reaction mixture is refluxed for an additional hour and then poured into cold water. The pH is adjusted to 8–10, and the polymer is removed from the reaction mixture by filtration. The polymer is further purified by dissolving in methyl ethyl ketone and adding the solution dropwise to water to reprecipitate the polymer. Infra-red analysis shows that all of the oxime groups have been converted to amino groups. The product is dissolved in dioxane to form a solution of 50 parts of polymer in 50 parts of solvent. This solution is cast onto a glass plate to form a clear, flexible film.

Example III

A styrene homopolymer having a molecular weight of about 35,000 is stearylated by a Friedel-Crafts reaction to form a polymer containing one stearyl group per aromatic ring. Eight parts of the stearylated polystyrene and 6 parts of hydroxylamine hydrochloride are dissolved in a mixture of 24 parts of absolute ethanol and 45 parts of dry pyridine. The mixture is refluxed for 48 hours and then poured into cold water. Infra-red analysis of the product shows that substantially all of the carbonyl groups of the stearylated polystyrene have been converted to oxime groups.

Example IV

A reaction vessel is charged with a solution of 5 parts of the oxime polymer of Example III in 135 parts of tetrahydrofuran. A suspension of 5 parts of lithium aluminum hydride in 44 parts of tetrahydrofuran is added to the solution with agitation under such conditions that the reaction mixture begins to reflux gently. When all of the lithium aluminum hydride suspension has been added, the reaction mixture is refluxed for an additional hour and then poured into water. The pH is adjusted to 8–10, and the polymer is removed from the reaction mixture by filtration. The polymer is further purified by dissolving in methyl ethyl ketone and adding the solution dropwise to water to reprecipitate the polymer. Infra-red analysis shows that all of the oxime groups have been converted to amino groups. The product is useful as an ion exchange resin.

The acylated polystyrenes which are reacted with hydroxylamine hydrochloride and then reduced to form the products of this invention are styrene homopolymers which are substituted on the para-positions of the aromatic rings with aliphatic acyl radicals containing 2–24 carbon atoms. They may be prepared by reacting the appropriate acid anhydride or acid halide with a homopolymer of a styrene compound such as styrene, alphamethyl styrene, and ar-substituted derivatives thereof wherein the ar-substituents may be hydroxyl radicals or aliphatic hydrocarbon radicals containing 1–4 carbon atoms, such as p-hydroxy styrene, ortho- or para-methyl, ethyl, or butyl styrene, ortho, para dimethyl styrene, etc. This reaction is accomplished in a suitable solvent medium such as carbon disulfide in the presence of a Friedel-Crafts catalyst. The styrene homopolymers, before acylation, have molecular weights ranging from about 10,000 to 60,000. The degree of acylation may be controlled to yield products containing 0.1–1 acyl radical per aromatic ring. The aminated polymers obtained from polystyrenes in which 50–100% of the aromatic rings have been acylated form a preferred embodiment of this invention.

The p-acylated polystyrenes are reacted with hydroxylamine hydrochloride at reflux temperatures to convert the carbonyl groups to oxime groups. The resultant oxime polymers may be reduced by the process used in the examples, i.e., by reduction with lithium aluminum hydride, or by any of the other conventional reduction techniques, e.g., by hydrogenation over metallic hydrogenation catalysts such as Raney nickel, copper-chromium oxide, etc. When the polymers are reduced with lithium aluminum hydride, 1–3 moles of reducing agent are used per mole of acylated polymer unit. The reaction is accomplished in a solvent for the acylated polymer such as tetrahydrofuran, dioxane, diethyl ether, benzene, etc. at reflux temperatures. The polymer-lithium aluminum hydride complex which is formed is decomposed by the use of a hydrolyzing agent, e.g., water, ethanol, ethyl acetate, etc.

The products of this invention are aminated polystyrenes having the amino groups substituted on the alpha-carbon atoms of p-aliphatic substituents. The number of amino groups in the reduced polymers may be varied by varying the degree of acylation of the styrene homopolymer. The aminated polymers are soluble in common organic solvents such as higher alcohols, esters, ethers, ketones, hydrocarbons, tetrahydrofuran, etc.

Compositions containing the polymers of this invention may be modified by the incorporation of conventional additives such as dyes, pigments, fillers, extenders, etc. The polymers may be used alone or in combination with other polymeric materials, e.g., with other vinylidene polymers.

The polymers of this invention are useful in forming fibers, filaments, films, sheets, molding compositions, textile treating compositions, etc. They are particularly useful as ion exchange resins and for other polyelectrolyte applications.

The presence of the amino groups makes these polymers useful as precursors for further chemically modified polymers. For example, they may be reacted with polybasic acids or anhydrides to form polyamide type resins.

It is obvious that many variations may be made in the products and processes set forth above without departing from the spirit and scope of this invention.

What is claimed is:

1. A p-substituted homopolymer of a styrene compound of the group consisting of styrene and alpha-methyl styrene, said homopolymer being substituted on the para-positions of the aromatic rings with an alpha-amino aliphatic hydrocarbon radical containing 2–24 carbon atoms, said homopolymer before substitution on the para-positions having a molecular weight between about 10,000 and 60,000.

2. A p-substituted homopolymer as in claim 1 wherein the styrene compound is styrene.

3. A p-substituted homopolymer as in claim 1 wherein the p-substituent is an alpha-amino ethyl radical.

4. A p-substituted homopolymer as in claim 1 wherein 50–100% of the aromatic rings bear alpha-amino aliphatic substituents.

5. A process which comprises subjecting to the action of lithium aluminum anhydride at reflux temperatures the product obtained by refluxing a mixture of hydroxylamine hydrochloride and a p-acylated homopolymer of a styrene compound of the group consisting of styrene and alpha-methyl styrene, said homopolymer being substituted on the para-positions of the aromatic rings with an aliphatic acyl hydrocarbon radical containing 2–24 carbon atoms, said homopolymer before substitution on the para-positions having a molecular weight between about 10,000 and 60,000.

References Cited in the file of this patent

UNITED STATES PATENTS

| | | |
|---|---|---|
| 2,642,398 | Butler | June 16, 1953 |
| 2,691,640 | Patterson et al. | Oct. 12, 1954 |

FOREIGN PATENTS

| | | |
|---|---|---|
| 720,593 | Great Britain | Dec. 22, 1954 |

OTHER REFERENCES

"Reduction of Organic Compounds by Lithium Aluminum Hydride," Nystrom et al., Journal Am. Chem. Soc., May 1947, vol. 69, pages 1197–1199.